Feb. 23, 1954  D. D. BALLEW  2,669,947
DOUGHNUT FILLING MACHINE
Filed Jan. 7, 1953  2 Sheets-Sheet 1
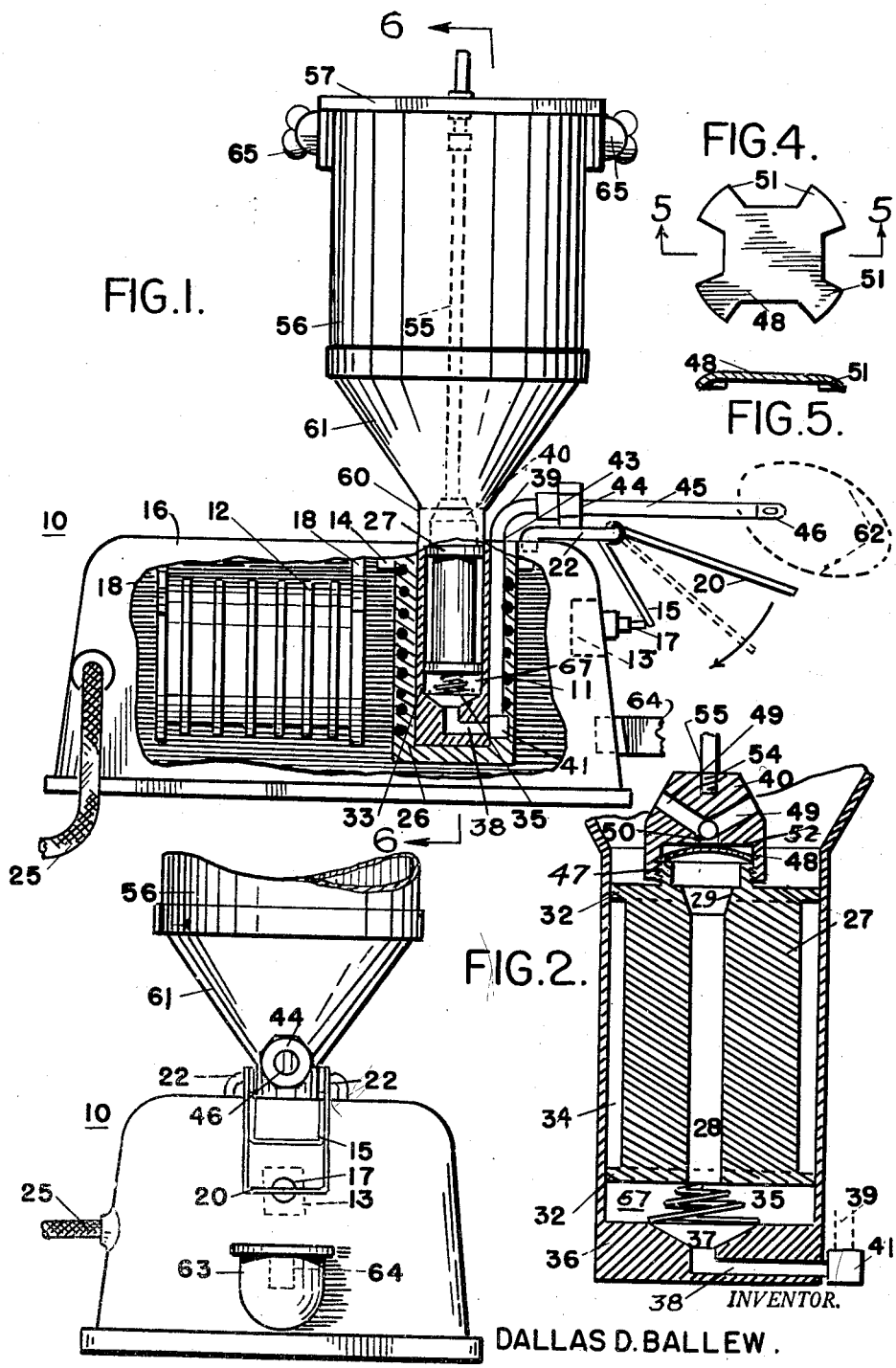
INVENTOR.
DALLAS D. BALLEW.
BY Howard J. Whelan.
ATTORNEY Feb. 23, 1954　　　　　D. D. BALLEW　　　　　2,669,947
DOUGHNUT FILLING MACHINE
Filed Jan. 7, 1953　　　　　　　　　　　2 Sheets-Sheet 2

INVENTOR.
DALLAS D. BALLEW
BY *Howard J. Whelan*
ATTORNEY

Patented Feb. 23, 1954

2,669,947

UNITED STATES PATENT OFFICE 2,669,947

DOUGHNUT FILLING MACHINE

Dallas D. Ballew, Baltimore, Md.

Application January 7, 1953, Serial No. 330,100

6 Claims. (Cl. 107—1)

1

This invention relates to dispensers for filling cakes, doughnuts, and other confections with syrups, jellies, preserves and other items suitable for eating as well as making a combination that is attractive and consumable. More particularly it pertains to a device of the dispensing type that provides for the mechanical propulsion of the fluid filling in predetermined quantities through a spout of convenient design to the article of food brought into its sphere of functioning, through the manual positioning by an operator.

In a present form of dispenser of this type, difficulty is experienced in preventing the device from gumming up, by reason of the filling entering into the moving parts of the mechanism used for forcing the fluid material from the dispenser. The motor employed for operating the conventional mechanism is of the high-speed rotary type and requires considerable energy in its use. At the same time the control of the mechanism and the flow of the filling is not as operationally smooth and sharply tuned to dispense the materials as desired, to meet the sanitary requirements approved for the production of commercial food products.

This invention anticipates these difficulties in an effective and economical manner. The filling is held in a reservoir or filling tank, with an outlet formed therein (at the bottom). It has a funnel leading to a cylinder vertically extended therefrom. A hollow plunger reciprocates in this cylinder under the action of a solenoid and measures out the quantity of filling to be dispensed. It forces the filling out by intermittent strokes from the cylinder into a spout arranged to deliver it to the article of food presented manually by the operator for filling.

The invention has amongst its objects the provision of a new and improved filling dispenser for injecting jellies and other edible products into articles of food that will avoid some of the disadvantages and limitations of the prior art.

Another object of the invention is to provide a new and improved filling dispenser for articles of food, that will not gum up during its operation and become inoperative because of the filling entering and compacting in the mechanism.

A further object of the invention is to provide a new and improved filling dispenser for articles of food that will operate intermittently to deliver predetermined quantities of filling to the articles as they are brought up against it.

A further object of the invention is to provide a new and improved filling dispenser comprising a container for the filling material removably

2 positioned in the operating means, but not otherwise attached thereto.

Other objects will become apparent as the invention is more fully explained.

For a better understanding of the invention, its principles, objects and operation, reference is made to the accompanying drawings, wherein a particular form of the invention is illustrated by way of example. These drawings when used in conjunction with the following description indicate a preferred form, while the claims emphasize the scope of the invention.

In the drawings:

Figure 1 is a side elevation of the filling dispenser, embodying this invention, with portions broken away to show its internal construction;

Figure 2 is an enlarged sectional elevation through the cylinder and plunger included in this embodiment;

Figure 3 is a front elevation of the embodiment with a portion of the reservoir or filling tank cut off;

Figure 4 is a plan view of the check valve disc used in the embodiment to control the flow of filling material to and from the plunger;

Figure 5 is a side elevation taken along line 5—5 of Figure 4;

Similar reference numerals refer to the same parts throughout the drawings.

Figure 13:
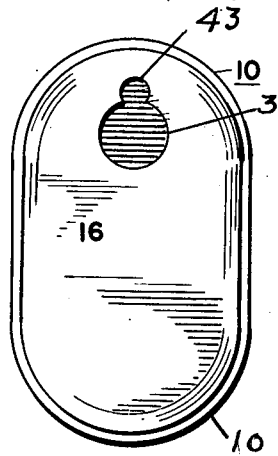
Figure 13 is a plan view of the base showing the irregular shaped holes and magnetic windings to enable the filling tank, tubing and spout to be removed in one piece from the base and operating means.
Figure 6:
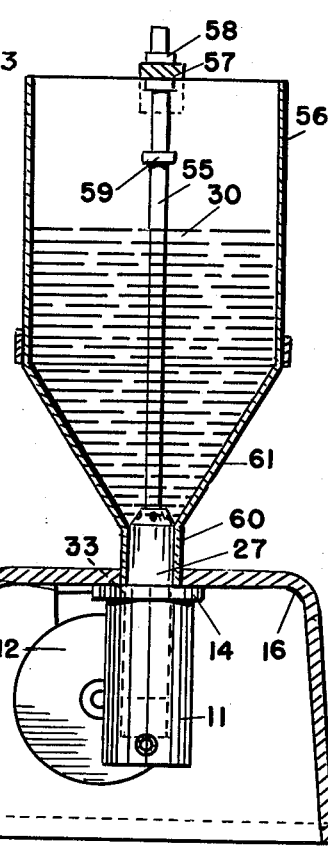
Figure 6 is a sectional elevation taken on line 6—6 of Figure 1.
Figure 8:
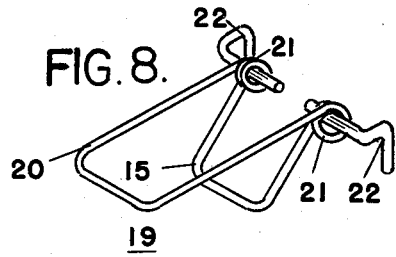
Figure 8 is a detail in perspective of the mechanism used in this embodiment to operate the control switch of the solenoid circuit.
Figure 7:
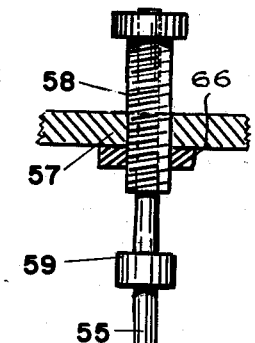
Figure 7 is a detail of the cross strut and adjustable stop for guide bar attached to the plunger.
Figure 12:
Figure 12 is a detail of the spring used to tension the plunger in the cylinder.
Figure 14:
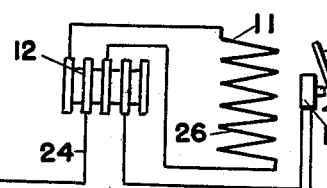
Figure 14 is a diagram of the electrical control circuit of the solenoid.
Figure 11:
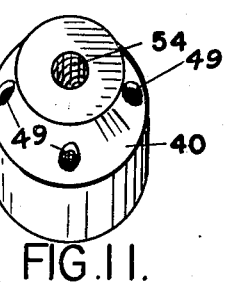
Figure 11 is a detail in perspective of the plunger head used in this embodiment.
Figure 9:
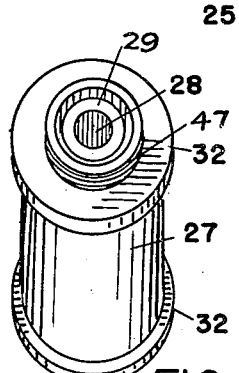
Figure 9 is a detail in perspective of the plunger used in this embodiment.
Figure 10:
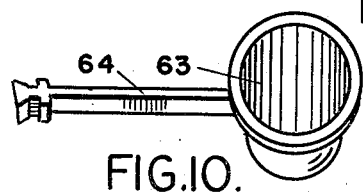
Figure 10 is a perspective view of the drip collector used in this embodiment.

Referring to Figure 1, particularly, in which the invention is illustrated partly in section, a base 10 consists of a shell forming an inclosure in which a solenoid 11, a rectifier 12 and a microswitch 13 are located. The solenoid 11 has a flange 14 through which screws pass to hold it securely to top wall 16. Likewise the selenium rectifier 12 is held to this wall 16 by the brackets 18 extending from one wall to the other. The microswitch 13 is internally mounted with its operating button 17 extending through the front side wall of the base for facile operation by a handle mechanism 19.

The handle mechanism 19 consists of a U-formed wire handle 20 having coils 21 and a switch pushing bar 15. The coils 21 are fastened to a pair of supporting brackets 22 rigidly installed in the top wall of the base. The coils 21 resiliently tension on the brackets 22 when the U-form handle 20 is pressed downwardly. When the handle 20 is pressed down the switch pushing bar 15 registers with the switch button 17 and closes the switch. When the pressure is removed the handle 20 recoils upwardly and the switch button returns to open position. The switch 13 is connected in the circuit 23 so as to energize the solenoid 11 from the current passing from the selenium rectifier 12. The rectifier 12 has connections 24 leading to a cable 25 attached to an exterior electrical service.

The solenoid 11 has irregular form coil windings 26 within its housing which induce a flux of magnetism tending to draw its iron core plunger downwardly. The core in this instance is a plunger 27 of special form. It is of course made of iron or other suitable magnetic material. The plunger is provided with a passage 28 passing longitudinally through it. This passage serves as a duct to lead the filling material 30 to the article of food 62 to be filled. The entrance 29 of the passage 28 has angular wall 29 for funneling the filling material into the passage 28 from the filling tank 56 mounted above. Flanges 32 are peripherally radiated at the top and bottom of the plunger to run against the walls of the neck 60 and guide it in its reciprocation. The neck 60 is positioned centrally in the solenoid 11 and forms a guide for the core or plunger 27 to travel in. The flanges 32 encompass an annular space 34 as may be noted in Figure 2. This space serves as a catch-all for any filling leaking past the flanges and prevents the filling material from compacting and hardening and prevents the plunger from being gummed to the wall of the neck 60. The plunger 27 has a relatively short stroke under the action of the solenoid and journal 58. A converging coil spring 35 presses against the bottom of the plunger and tends to keep it lifted to the upper or normal limit of its stroke. This kind of spring is preferably employed because it takes up little room and can be pressed flat to about the thickness of the wire of which it is made, and therefore avoids the necessity of making the cylinder unduly long. The bottom wall 36 of the tank neck 60 is made with a funnel shaped outlet 37 leading to a duct 38 employed for delivering the filling 30 to a pipe 39 and a fitting 41, for coupling purposes. A tubing 39 is coupled to the fitting 41 and passes up through a hole 43 in the wall 16, where it is rounded into an elbow and terminated in a union 44. A suitable spout 45 is removably attached by this union and has its end portion or nozzle 46 tapered to cut into the article and deliver the filling into the article of food to be filled.

The spout 45 is extended above the base 10 and is in a convenient position for the manual placement of the article of food thereon by the operator, and positioned over the U-form wire handle 20 so the latter can be operated while the filling action is taking place.

The plunger 27 has a filler head 40 screw threaded to fit securely on the screw threaded neck 47 projecting from the upper portion of the plunger 27. The neck 47 is ring-like in form and provides a cup above the angular wall 29. The filler head 40 likewise is hollowed out and holds a flattened check valve plate 48 within it. This plate fits flat against the under surface of the upper wall 52 of the head 40 to close off an opening 50 therein through which the filling would flow back into the head. The check valve plate is preferably made with four bent wings 51 as shown in Figure 5 of the drawings, and the periphery of these wings are bent to enable them to fit against the face of the neck 47. The wings limit the downward movement of the plate 48. The wings 51 provide spaces through which the filling can flow into the passage 28 when the plate 48 is down on the face of the neck 47. When the plate is raised up it closes off the opening 50 and shuts off the reverse flow of the filling into the head as explained above. The head 40 is formed solid on top and having angular passages 49 leading into it and to the opening 50. A screw-threaded hole 54 is provided in the head into which a guide bar 55 is threaded. The guide bar 55 is extended vertically from the head 40 up through a filling tank 56 to a cross strut 57 fastened to its top rim by wing nuts 65 and passes through a journal 58 which is threaded through strut 57 and is guided thereby during its reciprocation. The journal 58 is adjustably positioned in the strut to regulate the amount of filling taken into the plunger on each up stroke. The adjustment of the journal is held in the strut by a nut 66. A collar 59 is affixed on the bar 55 and controls the upward travel of the bar 55 when it hits the bottom of the journal 58.

The filling tank 56 is funnel shaped at its lower portion 61 to guide the filling material to the filling head and plunger 27. A cylindrical neck 60 surrounds the filling head where the funnel joins the base 10 in the hole 33. A cup 63 is placed adjacent to the nozzle 46 to collect drippings and is held in position by a bracket 64 dovetailing into the base 10.

The operation of the dispenser is as follows: The filling tank is supplied with filling material to a suitable level. The operator then operates the microswitch 13 a number of times to fill the plunger and spout. When the system from the filling tank to the dispensing nozzle are filled, it is ready for use. The operator then pushes the doughnut or other article of food 62 over the nozzle 46 and as he does so presses down on the U-shaped handle 20 until it operates the microswitch 13. The microswitch throws the solenoid into the circuit and magnetically draws the plunger 27 downwardly, against the resilient resistance of the spring 35. This plunger action squeezes the filling material in the space 67 underneath it, into the funnel outlet 37 and through the duct 38, pipe 39, spout 45, where it passes from the nozzle into the doughnut. The valve plate 48 closes the opening 50 on the downstroke to prevent the filling material from returning to the tank. On the removal of the doughnut the handle 20 rises and releases the button 17 of the switch, and opens the electrical circuit allowing the solenoid to discontinue its attraction and downward movement of the plunger. The plunger 27 then rises under the resiliency of the spring 35 to the limit of its stroke, the valve plate 48 falls away from the opening 50 and permits the filling material to enter into the passage 28 of the plunger ready for the next operation of filling another doughnut. The process continues indefinitely.

Some of the features of the invention can be readily observed. The flanges 32 of the plunger 27 ride on the wall of the neck 60 and keep the filling material from entering between the wall of the plunger and that of the neck 60. At least enough of the filling is kept out to prevent it filling the annular space 34 and compacting and causing the surfaces to gum against each other. The filling is usually of a heavy fluid nature. The use of a solenoid instead of a rotary motor eliminates the need for speed reducing mechanisms and the components incidental to their use. The use of cams are avoided as well as the shafts to support and rotate them. Its valve mechanism is simple but effective and is practically fool proof. The use of a solenoid core in the form of a hollow plunger is unique and makes double use of the structure of the solenoid to act as a component of the dispensing mechanism, thus saving in space and the number of parts used. This has an important bearing on the cost of manufacture of the device and the economy of its operation. The equipment can be dismantled quickly and easily for inspection, cleaning or repair and thereby offers all the features desirable from a sanitary point of view. It is arranged so that the filling material is encased in the filling tank which is leakproof and easily removable and interchangeable with other filling tanks and the parts will register in their correct positions automatically when assembled in the order required of them. Dripping of the filling material is taken care of by a removable cup 63. An important item in the operation of the machine is that it is practically noiseless because the filling material absorbs the sound of the moving parts, since the latter work in the fluid and prevents metal to metal contact. Adjustments in the travel and movement of the components are readily made and enable the device to work as closely to requirements as may be desirable.

The drawings and specifications have been drawn to illustrate one form of the invention, but not as a limit to such design, as it is appreciated that other forms could be designed and made that would use the same principles and come within the scope of the appended claims.

Having thus described the invention, what is claimed is:

1. A filling dispenser comprising in combination, a base, a solenoid unit mounted on said base, a core-like plunger operable within said solenoid unit and hollowed out to receive and dispense filling material, a filling tank connected with said plunger for guiding said material therethrough into said plunger, and a spout connected to said filling tank for delivering said material therefrom as the plunger operates therein, means for delivering the material to said plunger, said plunger being operable reciprocatably in said filling tank and the core of said plunger being hollowed out to provide a longitudinal passage therethrough from the said head to the bottom of said plunger and the connection to said spout, said filling tank including a passage arranged to permit the plunger to reciprocate therein and a wall at a predetermined portion of said passage having an orifice therein for connection to said spout as aforesaid, a switch and electrical circuit means for operating the solenoid positioned on said base adjacent to the location of said spout to permit facile access thereto while filling said article, said means including a resilient handle mechanism mounted on the base and actuated as the article to be filled is brought against said spout.

2. A filling dispenser comprising in combination, a base, a solenoid unit mounted on said base, a core-like plunger operable within said solenoid unit and hollowed out to receive and dispense filling material, a filling tank connected with said plunger for guiding said material therethrough into said plunger, and a spout connected to said filling tank for delivering said material therefrom as the plunger operates therein, means for delivering the material to said plunger, said plunger being operable reciprocatably in said filling tank and the core of said plunger being hollowed out to provide a longitudinal passage therethrough from the said head to the bottom of said plunger and the connection to said spout, said filling tank including a passage arranged to permit the plunger to reciprocate therein and a wall at a predetermined portion of said passage having an orifice therein for connection to said spout as aforesaid, a switch and electrical circuit means for operating the solenoid positioned on said base adjacent to the location of said spout to permit facile access thereto while filling said article, said means including a resilient handle mechanism mounted on the base and actuated as the article to be filled is brought against said spout, said plunger including flanges projecting peripherally therefrom to form an annular space between said flanges to receive any filling material that passes the upper flange and prevent its compacting to slow up the operation of the plunger.

3. A filling dispenser comprising in combination, a base, a solenoid unit mounted on said base, a core-like plunger operable within said solenoid unit and hollowed out to receive and dispense filling material, a filling tank connected with said plunger for guiding said material therethrough into said plunger, and a spout connected to said filling tank for delivering said material therefrom as the plunger operates therein, means for delivering the material to said plunger, said plunger being operable reciprocatably in said filling tank and the core of said plunger being hollowed out to provide a longitudinal passage therethrough from the said head to the bottom of said plunger and the connection to said spout, said filling tank including a passage arranged to permit the plunger to reciprocate therein, and a wall at a predetermined portion of said passage having an orifice therein for connection to said spout as aforesaid, a switch and electrical circuit means for operating the solenoid positioned on said base adjacent to the location of said spout to permit facile access thereto while filling said article said means including a resilient handle mechanism mounted on the base and actuated as the article to be filled is brought against said spout, said plunger including flanges projecting peripherally therefrom to form an annular space between said flanges to receive any filling material that passes the upper flange and prevent its compacting to slow up the operation of the plunger, said plunger including a check valve for facilitating the movement of the filling material out of the plunger when it moves in one direction and into the plunger when it moves in the opposite direction.

4. A filling dispenser comprising in combination, a base, a solenoid unit mounted on said base, a core-like plunger operable within said solenoid unit and hollowed out to receive and dispense filling material, a filling tank connected with said plunger for guiding said material therethrough into said plunger, and a spout connected to said filling tank for delivering said material therefrom as the plunger operates therein, means for delivering the material to said plunger, said plunger being operable reciprocatably in said filling tank and the core of said plunger being hollowed out to provide a longitudinal passage therethrough from the said head to the bottom of said plunger and the connection to said spout, said filling tank including a passage arranged to permit the plunger to reciprocate therein and a wall at a predetermined portion of said passage having an orifice therein for connection to said spout as aforesaid, a switch and electrical circuit means for operating the solenoid positioned on said base adjacent to the location of said spout to permit facile access thereto while filling said article, said means including a resilient handle mechanism mounted on the base and actuated as the article to be filled is brought against said spout, said plunger including flanges projecting peripherally therefrom to form an annular space between said flanges to receive any filling material that passes the upper flange and prevent its compacting to slow up the operation of the plunger, said plunger including a check valve for facilitating the movement of the filling material out of the plunger when it moves in one direction, and into the plunger when it moves in the opposite direction, and a resilient member in the unit for returning the plunger to a predetermined position when not pulled upon by said solenoid.

5. A filling dispenser comprising in combination, a base, a solenoid unit mounted on said base, a core-like plunger operable within said solenoid unit and hollowed out to receive and dispense filling material, a filling tank connected with said plunger for guiding said material therethrough into said plunger, and a spout connected to said filling tank for delivering said material therefrom as the plunger operates therein, means for delivering the material to said plunger, said plunger being operable reciprocatably in said filling tank and the core of said plunger being hollowed out to provide a longitudinal passage therethrough from the said head to the bottom of said plunger and the connection to said spout, said filling tank including a passage arranged to permit the plunger to reciprocate therein, and a wall at a predetermined portion of said passage having an orifice therein for connection to said spout as aforesaid, a switch and electrical circuit means for operating the solenoid positioned on said base adjacent to the location of said spout to permit facile access thereto while filling said article, said means including a resilient handle mechanism mounted on the base and actuated as the article to be filled, is brought against said spout, said plunger including flanges projecting peripherally therefrom to form an annular space between said flanges to receive any filling material that passes the upper flange and prevent its compacting to slow up the operation of the plunger, said plunger including a check valve for facilitating the movement of the filling material out of the plunger when it moves in one direction and into the plunger when it moves in the opposite direction, a resilient member in the unit for returning the plunger to a predetermined position when not pulled upon by said solenoid, and a drip cup removably attached to said base for collecting dripping from said spout.

6. A filling dispenser comprising in combination, a base, a solenoid unit mounted on said base, a core-like plunger operable within said solenoid unit and hollowed out to receive and dispense filling material, a filling tank connected with said plunger for guiding said material therethrough into said plunger, and a spout connected to said filling tank for delivering said material therefrom as the plunger operates therein, means for delivering the material to said plunger, said plunger being operable reciprocatably in said filling tank and the core of said plunger being hollowed out to provide a longitudinal passage therethrough from the said head to the bottom of said plunger and the connection to said spout, said filling tank including a passage arranged to permit the plunger to reciprocate therein and a wall at a predetermined portion of said passage having an orifice therein for connection to said spout as aforesaid, a switch and electrical circuit means for operating the solenoid positioned on said base adjacent to the location of said spout to permit facile access thereto while filling said article, said means including a resilient handle mechanism mounted on the base and actuated as the article to be filled is brought against said spout, said plunger including flanges projecting peripherally therefrom to form an annular space between said flanges to receive any filling material that passes the upper flange and prevent its compacting to slow up the operation of the plunger, said plunger including a check valve for facilitating the movement of the filling material out of the plunger when it moves in one direction and into the plunger when it moves in the opposite direction, a resilient member in the unit for returning the plunger to a predetermined position when not pulled upon by said solenoid, a drip cup removably attached to said base for collecting dripping from said nozzle, and means for holding, guiding and controlling the travel of said plunger connected with the filling tank.

DALLAS D. BALLEW.

References Cited in the file of this patent

UNITED STATES PATENTS

| Number | Name | Date |
| --- | --- | --- |
| 950,410 | Smith | Feb. 22, 1910 |
| 2,381,650 | Dick | Aug. 7, 1945 |